United States Patent
Caretti et al.

(10) Patent No.: US 11,388,735 B2
(45) Date of Patent: Jul. 12, 2022

(54) MOBILE TELECOMMUNICATION NETWORK ARCHITECTURE FOR MITIGATING UPLINK INTERFERENCE

(71) Applicant: TELECOM ITALIA S.p.A., Milan (IT)

(72) Inventors: Marco Caretti, Turin (IT); Gian Michele Dell'Aera, Turin (IT); Maurizio Fodrini, Turin (IT); Bruno Melis, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 193 days.

(21) Appl. No.: 16/619,596

(22) PCT Filed: Jun. 14, 2018

(86) PCT No.: PCT/EP2018/065874
§ 371 (c)(1),
(2) Date: Dec. 5, 2019

(87) PCT Pub. No.: WO2019/001983
PCT Pub. Date: Jan. 3, 2019

(65) Prior Publication Data
US 2020/0163101 A1      May 21, 2020

(30) Foreign Application Priority Data
Jun. 29, 2017   (IT) ..................... 102017000072886

(51) Int. Cl.
| | | |
|---|---|---|
| *H04W 72/12* | (2009.01) | |
| *H04W 16/28* | (2009.01) | |
| *H04W 72/04* | (2009.01) | |

(52) U.S. Cl.
CPC ....... *H04W 72/1226* (2013.01); *H04W 16/28* (2013.01); *H04W 72/0406* (2013.01); *H04W 72/1268* (2013.01)

(58) Field of Classification Search
CPC ............. H04W 72/1226; H04W 16/28; H04W 72/0406; H04W 72/1268; H04W 72/082
See application file for complete search history.

(56) References Cited

U.S. PATENT DOCUMENTS

| | | | | |
|---|---|---|---|---|
| 2005/0026622 A1* | 2/2005 | Georgeaux | ............ | H04W 48/02 455/450 |
| 2011/0053647 A1* | 3/2011 | Oyama | ................. | H04W 16/28 455/562.1 |

(Continued)

FOREIGN PATENT DOCUMENTS

| | | | |
|---|---|---|---|
| EP | 2 930 982 A1 | 10/2015 | |
| WO | WO 2016/014192 A1 | 1/2016 | |

OTHER PUBLICATIONS

International Search Report and Written Opinion dated Aug. 10, 2018 in PCT/EP2018/065874 filed on Jun. 14, 2018.

*Primary Examiner* — Ivan O Latorre
(74) *Attorney, Agent, or Firm* — Oblon, McClelland, Maier & Neustadt, L.L.P.

(57) ABSTRACT

A method for managing a full duplex mobile telecommunication network, includes measuring power of uplink and down link transmission from adjacent base stations and a user equipment, respectively. The method also includes comparing the measured powers of the uplink and downlink transmission, and if the power of the uplink transmission is lower than the power of the downlink transmission, the base station allocates dedicated uplink resources to the uplink transmission. The dedicated uplink resources are radio resources reserved only for uplink transmissions and are not (Continued)

usable for downlink transmissions. The dedicated uplink resources are assigned to the user equipment.

9 Claims, 4 Drawing Sheets

(56) References Cited

U.S. PATENT DOCUMENTS

| | | | | |
|---|---|---|---|---|
| 2012/0178467 A1* | 7/2012 | Fujii | ................ | H04W 72/0406 455/452.1 |
| 2013/0084907 A1* | 4/2013 | Shen | ................ | H04W 72/1226 455/501 |
| 2013/0121186 A1* | 5/2013 | Vajapeyam | ......... | H04W 72/085 370/252 |
| 2013/0155991 A1* | 6/2013 | Kazmi | ............. | H04W 72/0453 370/329 |
| 2013/0217402 A1* | 8/2013 | Lin | ................... | H04W 72/1226 455/450 |
| 2016/0029404 A1 | 1/2016 | Aryafar et al. | | |
| 2016/0227487 A1* | 8/2016 | Kakura | ................ | H04W 52/22 |
| 2017/0033881 A1* | 2/2017 | Wu | ................... | H04W 72/1231 |
| 2017/0034790 A1 | 2/2017 | Lopez-Perez et al. | | |
| 2017/0164206 A1* | 6/2017 | Madan | ................. | H04W 16/10 |

\* cited by examiner

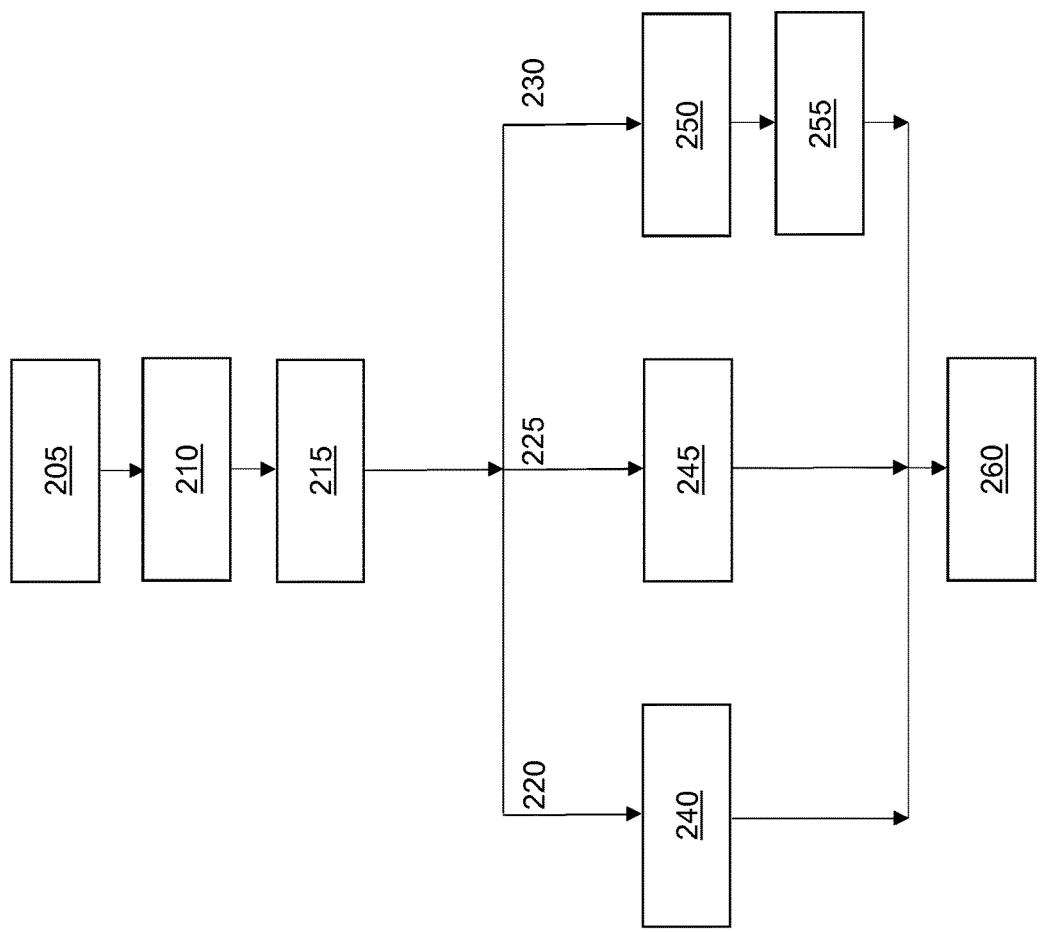

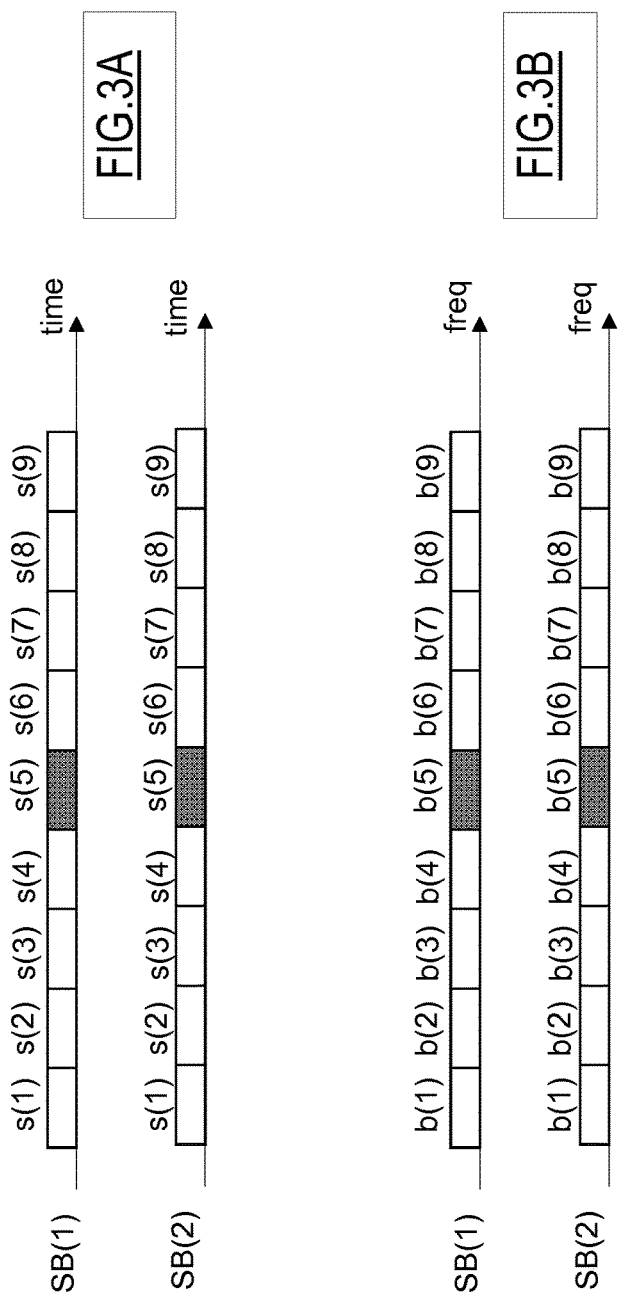
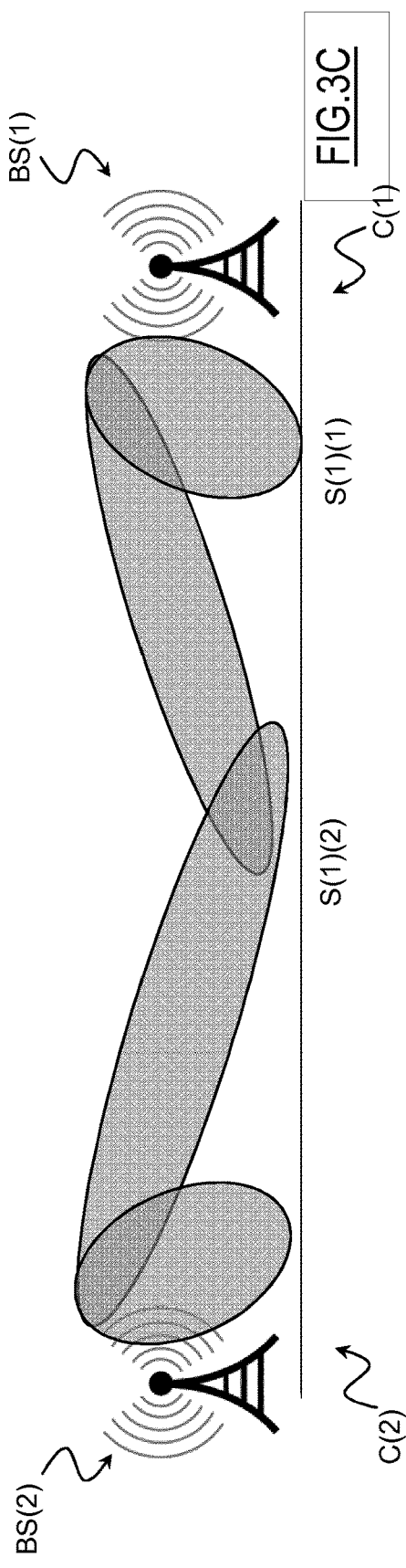
FIG.3A
FIG.3B
FIG.3C

MOBILE TELECOMMUNICATION NETWORK ARCHITECTURE FOR MITIGATING UPLINK INTERFERENCE

BACKGROUND OF THE INVENTION

Field of the Invention

The present invention generally relates to the telecommunications field. More particularly, the present invention relates to the management of node-to-user interference in a full duplex telecommunication network, such as a full duplex mobile telecommunication network.

Overview of the Related Art

In already known networks it is generally very difficult to transmit and receive at the same time on the same frequencies because the act of transmission creates a massive amount of interference for the receiver, preventing the receiver from detecting the desired signal coming from the other end of the wireless link. This is the reason why in previous network technologies, such as in 4G networks, the uplink transmission from User Equipment (UE) to the network infrastructure nodes (Evolved NodeB, "eNodeB") and the downlink transmission from eNodeB to UE are separated in time according to a Time Division Duplex (TDD) modality or are separated in frequency using a Frequency Division Duplex (FDD) modality.

A recent new transmission technology denoted as "Full Duplex Transmission" and described in the document "*Applications of Self-Interference Cancellation in 5G and Beyond*" by S. Hong et al, Kumu Networks and Stanford University, IEEE Communications Magazine, February 2014 has been developed, according to which a network node (e.g., an eNodeB) is able to transmit a signal (e.g., to a UE) and simultaneously receive signals from other radio sources (e.g., a different UE) in the same frequency band exploiting a Full Duplex (FD) transmission.

The FD transmission technology exploits a self-interference cancellation technique. This technique is based on the idea that since a node already knows the signal it has to transmit in downlink, the same node can exploit this information to remove the self-interference originated by such transmitted signal to correctly receive uplink transmissions coming from UE. Since the downlink signal which can generate self-interference is locally generated at the node, the power of the uplink signals coming from UE and received by such node has several dBs of attenuation with respect to the self-interference that has to be removed. The FD technology makes possible the simultaneous uplink and downlink transmission between a UE and an eNodeB on the same band, however some interference problems still arise by considering that usually multiple FD connections may occur in the same or in adjacent cells.

Hereinafter, by "adjacent cells" it is intended in general cells whose base stations are affected by mutual interference. Said base stations belonging to adjacent cells are referred to as "adjacent base stations".

In a mobile telecommunication network exploiting the FD technology (hereinafter, briefly referred to as "mobile FD network" or simply "FD network") a critical issue regards how managing the interference generated by an interfering downlink transmission over an uplink transmission when the interfering downlink transmission is generated by a cell which is adjacent to the serving cell. Indeed, such kind of interference cannot be cancelled using the abovementioned self-interference cancellation technique since it is not caused by the serving cell itself (and therefore, it is not known to the latter).

In order to show how this issue negatively influences the operation of a FD network, reference is now made to the exemplificative FD communication network 100 illustrated in FIG. 1.

A first base station (e.g., eNodeB) BS(1) is physically located at a distance D from a second base station (e.g., eNodeB) BS(2). The first base station BS(1) covers a corresponding first geographic area (cell) C(1), and the second base station BS(2) covers a corresponding second geographic area (cell) C(2), which is adjacent to the first cell C(1).

From the downlink point of view, with traditional, non-FD networks, the edge between two adjacent cells such as the cells C(1) and C(2) (referred to as "non-FD cell edge" and identified in FIG. 1 with reference CE1) causes the formation of a corresponding edge area wherein the level of power received from the first base station BS(1) and the level of power received from the second base station BS(2) are similar. In this area, a UE UE(1) served for example by the first base station BS(1) receives an interfering signal provided by the second base station BS(2) having a power level similar to that of the signal transmitted by the serving first base station BS(1). From the uplink point of view, the edge area is the area comprising a UE UE(1) served by the first base station BS(1) and generating an uplink signal which is received by such first base station BS(1) at a power level which is similar to power level of an interference signal generated by another UE served by the adjacent second cell C(2). The user throughput performance in both downlink and uplink is highly reduced in the edge area.

In a FD network, i.e., in the case in which the first base station BS(1) is allowed to receive uplink transmissions from served UEs by exploiting resources which are concurrently used in downlink by the second base station BS(2) serving the adjacent cell, the edge area in uplink is extended. Indeed, in a network exploiting FD capability, the first base station BS(1) has to take into consideration an increased interference level due to the possible collisions between the (interfering) downlink transmission from the second base station BS(2) and the uplink transmission carried out by a served UE toward the first base station BS(1). As can be seen in FIG. 1, the uplink extended edge area of the first base station BS(1), identified with reference EEA1, is the area between the abovementioned non-FD cell edge CE1 and a FD cell edge CE2 located at a distance D' from the first base station BS(1) such that the power level received by the first base station BS(1) of an uplink transmission carried out by a UE UE(2) (served by the first base station BS(1)) located on said FD cell edge CE2 is similar to the power level received by the same first base station BS(1) of an interfering downlink transmission carried out by the adjacent second base station BS(2).

In a FD network that exploits the FD technique, uplink transmissions performed by UE are more critical than in traditional networks which use TDD or FDD modalities for duplexing.

Indeed, since the uplink transmission power capability of a UE is lower than the downlink transmission power capability of a base station, in a FD network, when a UE UE(3) located inside the uplink extended edge area EEA1 of the first base station BS(1) is transmitting in uplink toward the first base station BS(1), its uplink transmission is received at the first base station BS(1) at a power level which is lower than the received power level of an interfering downlink transmission carried out by the adjacent second base station BS(2). In other words, in a FD network, the uplink extended edge area EEA1 of the base station BS(1) is a critical area, since the UE located therein are received by the base station BS(1) with a power level which is lower than the one of the downlink signal generated by base stations BS(2) of adjacent interfering cells.

Moreover, since the antennas of the base stations are usually located at heights which are higher than those of the UE, uplink signals are subjected to larger propagation losses compared to the downlink signals.

Patent application WO 2015/077963 A1 discloses methods for handling uplink-to-downlink interference between a first UE served by a first base station and a second UE served by a second base station. The first base station and the second base station are with full-duplex mode. The first base station receives from the first UE information about a first received signal quality associated with the first base station and a second received signal quality associated with the second base station. The first base station generates a full-duplex interference list associated with the second base station by putting the first UE into the full-duplex interference list if a difference between the first received signal quality and the second received signal quality is smaller than a threshold. This patent application is also aimed towards methods for scheduling downlink reception and methods for scheduling uplink transmission.

Patent application WO 2013/107139 A1 discloses a full-duplex interference processing method and apparatus. One method comprises: obtaining the interference degree when a station device and at least two UEs perform full-duplex transmission; according to the interference degree, determining a UE capable of performing uplink and downlink signal transmission over the same time-frequency resource among the at least two UEs. Another method comprises: sending location related information to a station device; performing uplink and downlink signal transmission with other UEs over the same time-frequency resource, the other UEs comprising a UE determined by the station device according to the location related information and capable of performing uplink and downlink signal transmission over the same time-frequency resource. On the basis of the interference degree when a station device and at least two UEs perform full-duplex transmission, UEs capable of performing uplink and downlink signal transmission over the same time-frequency resource are classified, so as to avoid, as far as possible, the interference problem in a scenario of point-to-multipoint full-duplex communication.

SUMMARY OF THE INVENTION

The Applicant has found that FD telecommunication networks disclosed in the abovementioned prior documents are subject to strong performance degradation because of interference on UE uplink reception caused by interfering downlink transmissions generated by base stations of adjacent cells.

None of the cited prior art documents explicitly mentions solutions to manage such particular kind of interference.

In view of the above, the Applicant has faced the problem of how to manage a mobile FD network for handling interference on UE uplink reception at base stations caused by interfering downlink transmissions generated by base stations of adjacent cells.

In very general terms, the Applicant has found that by reserving special radio resources for uplink transmission only and allocating such resources to base stations which are serving UEs whose uplink transmission can be potentially affected by interference caused by interfering downlink transmissions generated by base stations of adjacent cells, the performances of the mobile FD network can be sensibly improved.

An aspect of the present invention relates to a method for managing a full duplex mobile telecommunication network.

According to an embodiment of the present invention, the method comprises having a base station measuring the power of downlink transmissions received by said base station from adjacent base stations.

According to an embodiment of the present invention, the method comprises having said base station measuring the power of uplink transmissions received by said base station from at least one served user equipment.

According to an embodiment of the present invention, the method comprises having said base station comparing the measured power of downlink transmissions with the measured power of uplink transmissions.

According to an embodiment of the present invention, if the measured power of an uplink transmission from a served user equipment is lower than the measured power of downlink transmissions by at least a corresponding amount, the method comprising carrying out the following operations:

having said base station allocating for the uplink transmission from said served user equipment corresponding first dedicated uplink radio resources, said first dedicated uplink radio resources being radio resources which are reserved only for uplink transmission, said first dedicated uplink radio resources, when allocated to said base station, being not usable for downlink transmissions by further base stations adjacent to said base station, and having said base station assigning said allocated first dedicated uplink radio resources to said served user equipment for uplink transmission from the served user equipment toward said base station.

According to an embodiment of the present invention, said mobile telecommunication network is arranged to comprise at least one coordination area comprising a group of adjacent base stations.

According to an embodiment of the present invention, said group comprises said base station and said further base stations.

According to an embodiment of the present invention, the method further comprises for said at least one coordination area, configuring radio resources by reserving uplink radio resources to the base stations belonging to said coordination area, said uplink radio resources being radio resources shared by the base stations belonging to the coordination area to be used only for uplink transmission.

According to an embodiment of the present invention, said first dedicated uplink radio resources is selected from the uplink radio resources reserved to the coordination area the base station belongs to.

According to an embodiment of the present invention, said configuring the radio resources for said at least one coordination area comprises selecting one or more subframes to be reserved only for uplink transmission.

According to an embodiment of the present invention, said configuring the radio resources for said at least one coordination area comprises selecting one or more portions of the bandwidth of the mobile telecommunication network to be reserved only for uplink transmission.

According to an embodiment of the present invention, each base station covers a corresponding cell according to a vertical sectorization deployment for which a high tilt beam defines a cell sector close to the edge of the cell and a low tilt beam defines a further cell sector close to the base station, said configuring the radio resources for said at least one coordination area comprising selecting radio resources of the cell sector close to the edge of the cell.

According to an embodiment of the present invention, said configuring the radio resources for said at least one coordination area is carried out by a selected one between:
- a central entity of the coordination area, and
- the base stations belonging the coordination area.

According to an embodiment of the present invention, said measuring the power of downlink transmissions comprises measuring the power levels of downlink reference signals transmitted by the adjacent base stations.

According to an embodiment of the present invention, said measuring the power of uplink transmissions comprises monitoring the physical random access channel used by the at least one served user equipment.

According to an embodiment of the present invention, said corresponding amount is equal to at least 2 dB.

Another aspect of the present invention relates to a full duplex mobile telecommunication network comprising a plurality of base stations. Each base station of the plurality comprises:
- a module for measuring the power of downlink transmissions received by said base station from adjacent base stations;
- a module for measuring the power of uplink transmissions received by said base station from at least one served user equipment;
- a module for comparing the measured power of downlink transmissions with the measured power of uplink transmissions;
- a module configured to allocate for the uplink transmission from said served user equipment, if the measured power of an uplink transmission from a served user equipment is lower than the measured power of downlink transmissions by a corresponding amount, corresponding first dedicated uplink radio resources, said first dedicated uplink radio resources being radio resources which are reserved only for uplink transmission, said first dedicated uplink radio resources, when allocated to said base station, being not usable for downlink transmissions by further base stations (BS (2)) adjacent to said base station, wherein
- said base station comprises a module for assigning said allocated first dedicated uplink radio resources to said served user equipment for uplink transmission from the served user equipment toward said base station.

According to an embodiment of the present invention, said full duplex mobile telecommunication network is arranged to comprise at least one coordination area each coordination area comprising a group of adjacent base stations, wherein:
- each coordination area comprises a central entity adapted to configure radio resources by reserving uplink radio resources to the base stations belonging to said coordination area, said uplink radio resources being radio resources shared by the base stations belonging to the coordination area to be used only for uplink transmission, wherein:
- said first dedicated uplink radio resources being selected from the uplink radio resources reserved to the coordination area the base station belongs to.

According to an embodiment of the present invention, said full duplex mobile telecommunication network is arranged to comprise at least one coordination area each coordination area comprising a group of adjacent base stations, wherein:
- the base stations of a coordination area are adapted to configure radio resources by reserving uplink radio resources to the base stations belonging to said coordination area, said uplink radio resources being radio resources shared by the base stations belonging to the coordination area to be used only for uplink transmission, wherein:
- said first dedicated uplink radio resources being selected from the uplink radio resources reserved to the coordination area the base station belongs to.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 2 is an activity flow chart illustrating the main operations of a procedure for managing uplink interference carried out by a base station of the FD communication network of FIG. 1 according to an embodiment of the present invention;

FIGS. 3A, 3B, and 3C illustrate three types of super-resources configurations according to some embodiments of the present invention.

DETAILED DESCRIPTION

In the following of the present description, the invention will be described using terminology compliant with 4G LTE/LTE-A systems. However, the concepts of the present invention can be applied to other wireless communication systems, such as for example the ones compliant with the future 5G communication systems. In this case, the used terminology may change, even though the function of specific network elements may remain the same.

Figure 1:
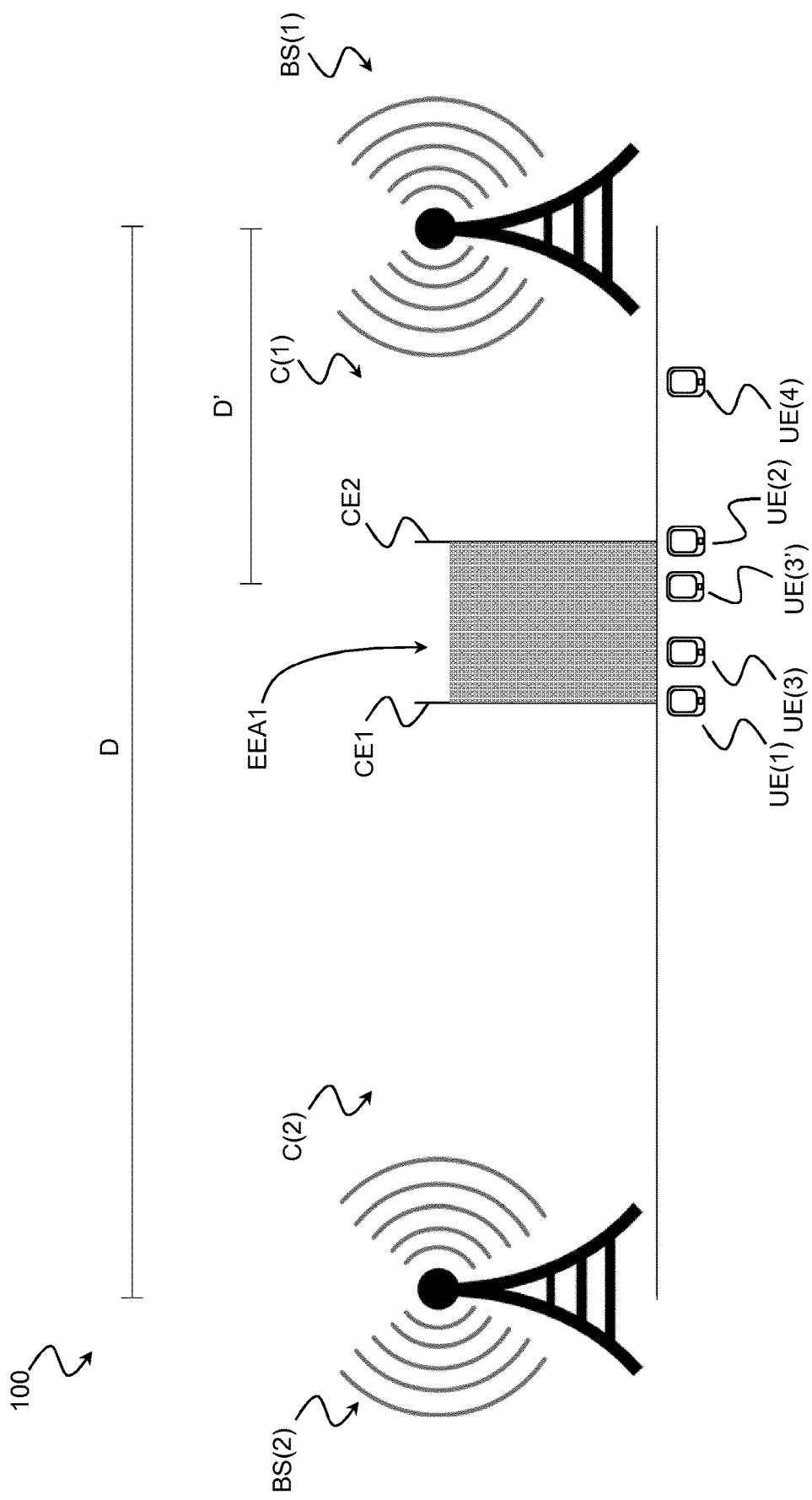
FIG. 1 illustrates an exemplificative FD communication network wherein the concepts of the present invention may be applied.

In very general terms, the present invention relates to a procedure for managing uplink interference in a FD network, which provides for assessing whether a UE served by a base station (such as the base station BS(1) of FIG. 1) is located in the uplink extended edge area (e.g., the uplink extended edge area EEA1) of such base station, and allocating radio resources to such UE based on the outcome of such assessment, i.e., by taking into account the assessed location of such UE with respect to the uplink extended edge area.

The procedure according to the embodiments of the present invention may be carried out by nodes, systems and/or modules of a FD network, wherein it should be noted that the terms 'node', 'system' or 'module' are herein intended to comprise, but not limited to, hardware, firmware, a combination of hardware and software, software.

For example, a node, system or module may be, but is not limited to being, a process running on a processor, a processor, an object, an executable, a thread of execution, a program, and/or a computing device (e.g., UE UE(1), UE(2), . . . , base stations BS(1), BS(2), . . . , as well as other radio network elements of the FD networks).

In other words, a node, system or module may comprise an application being executed on a computing device and/or the computing device itself.

One or more nodes, systems or modules may be localized on one computing device and/or distributed between two or more computing devices.

Nodes, systems or modules may comprise and/or interact with computer readable media having storing data according to various data structures.

The nodes, systems or modules may communicate by exploiting local and/or remote processes, preferably by means of electrical, electromagnetic and/or optical signals providing one or more data packets, such as data packets from one node, system or module interacting with another node, system or module in a local system, in a distributed system, and/or across a radio network and/or a wired network.

For example, according to an embodiment of the present invention, the procedure for managing interference affecting the uplink transmission of a UE served by a base station is carried out by such serving base station itself. In order to describe in greater detail such procedure according to embodiments of the present invention, reference will be made to the base station BS(1) of the very simplified scenario depicted in FIG. 1.

FIG. 2 is a activity flow chart 200 illustrating the main operations of the procedure for managing uplink interference in a FD network carried out by the FD network according to an embodiment of the present invention.

As will be described in detail in the following of the description, according to an embodiment of the present invention, most of the operations of such procedure may be concurrently carried out by each base station of the FD network—such as the base station BS(1)—in an individual way, such as for example through corresponding software and/or hardware modules thereof, while other operations may be carried out by a central entity of the FD network (such as a network resource manager) or may carried out in a distributed way out involving a group of coordinated base stations.

The first operation (block 205) carried out by the base station BS(1) provides for measuring the power of downlink transmissions received by the base station BS(1) from base stations of the adjacent cells, such as the base station BS(2). According to an embodiment of the present invention, these power measurements are carried out by the base station BS(1) by exploiting a radio discovering mechanism which provides for measuring the power levels of downlink reference signals transmitted by the base stations of the adjacent cells (and identified by means of respective Ids). In order to monitor how interference caused by downlink transmissions varies as time and/or frequency are varied, this operation is periodically reiterated by varying the resources allocated for the transmission of the downlink reference signals. For this reason the monitored downlink reference signals are transmitted by the base stations of the adjacent cells also inside the resources allocated to the users.

The next operation (block 210) carried out by the base station BS(1) provides for measuring the power of uplink transmissions received by the base station BS(1) from served UEs. According to an embodiment of the present invention, these power measurements are carried out by the base station BS(1) by monitoring the Physical Random Access Channel (PRACH) used by the UEs when the latter ask for uplink resources. Because of the importance of this channel, the PRACH design is quite robust in order to achieve a low error probability also in bad channel conditions. This is achieved by increasing the redundancy of the PRACH message and also by using an orthogonal allocation of the PRACH sequences among adjacent cells. The reception of the PRACH used by a UE is used by the base station BS(1) to obtain a measure of the received power of the uplink transmission generated by such UE. For this purpose, a measure is carried out on the power with which the PRACH is received. Based on the uplink power control algorithm which is usually employed for the user data transmission on the Physical Uplink Shared Channel (PUSCH), the base station BS(1) is able to estimate a measure of the received power of the uplink transmission. More particularly, the base station BS(1) measures the power with which the signal is transmitted by the UE, with such measure that is carried out on the PRACH signal, which is the first signal the UE sends when accessing the cell. Moreover, since said power may vary because of Power Control effect, the base station BS(1) may also carry out an estimation thereof.

According to an embodiment of the present invention, for each UE served by the base station BS(1), such base station BS(1) is configured to make a comparison (block 215) between the power of the downlink reference signals received from the base stations of the adjacent cells (measured at block 205) and the power of the PRACH used by said UE itself (measured at block 210).

At this point, the activity flow chart 200 splits into three branches (220, 225, 230) based on the outcome of the comparison carried out at block 215.

If the received power of the PRACH used by the UE is sensibly higher (e.g., higher by more than 2 dB, preferably higher by more than 5 dB, even more preferably higher by more than 10 dB) than the power of the downlink reference signals received from the base stations of the adjacent cells (branch 220), the UE is assumed to be sufficiently close to the base station BS(1) and to be located outside the uplink extended edge area EEA1 of the base station BS(1). This is for example the case of the UE identified with reference UE(4) in FIG. 1. In this case, the power of the uplink transmission coming from such UE UE(4) is so higher than the power level of the downlink transmissions generated by the base stations of the adjacent cells (e.g., the base station BS(2)), that the risk of interference is negligible, and the uplink transmission coming from the UE UE(4) is managed by the base station BS(1) without any particular expedient, i.e., by allocating thereto radio resources in the same way as for traditional networks which use TDD or FDD modalities for duplexing (block 240).

If the received power of the PRACH used by the UE is comparable (e.g., having a difference therefrom comprised between −2 dB and +2 dB) with the power of the downlink reference signals received from the base stations of the adjacent cells (branch 225), the UE is assumed to be located inside the uplink extended edge area EEA1 of the base station BS(1). This is for example the case of the UE identified with reference UE(3') in FIG. 1. In this situation, the reception of the uplink transmission of the UE UE(3') by the base station BS(1) may be negatively affected because of the interference caused by the downlink transmissions coming from the adjacent cells (e.g., generated by the base station BS(2)). According to an embodiment of the present invention, such interference is suppressed through an interference suppression procedure which can be classified as a Network Assisted Interference Cancellation and Suppression ("NAICS", see for example 3GPP document R4-131771, *"Analysis of the candidate LTE receiver structures for Interference Cancellation and Suppression"*, 3GPP meeting R4-66b, 2013 Apr. 15, Chicago) where the cell-to-cell interference is the negative effect to be cancelled by means of capable base station receivers.

For this purpose, according to an embodiment of the present invention, the base station BS(1) is configured to request some information useful to characterize such interference to the Radio Resource Controller (RRC) of the base station(s) which are generating interfering downlink transmissions, such as for example transmitting power/bandwidth, served users Ids, scheduling information, and/or transmission mode. Then (block 245), the base station BS(1) allocates radio resources for the uplink transmission of the UE UE(3') while suppressing at the same time the interference caused by the downlink transmissions generated by the adjacent base stations over the allocated uplink resources by taking advantage of such collected information.

If the received power of the PRACH used by the UE is lower than the power of the downlink reference signals received from the base stations of the adjacent cells by an amount, such as 2 dB or more (branch 230), the UE is assumed to be located inside the uplink extended edge area EEA1 of the base station BS(1) (such as UE identified with reference UE(3) in FIG. 1). However, unlike the previous case in which the power of the received PRACH used by the UE is comparable with the power of the downlink reference signals received from the base stations of the adjacent cells, in this case the power of the interfering downlink reference signals is too high to allow an efficient interference suppression procedure like the one used at block 245. According to an embodiment of the present invention, instead of suppressing such downlink interference affecting the uplink transmission of the base station BS(1), the downlink interference is directly prevented through an interference handling procedure (blocks 250-255) which provides for allocating dedicated uplink radio resources, called "super-resources". According to an embodiment of the present invention, "super-resources" of a FD network are radio resources which are reserved for uplink transmission only. According to an embodiment of the present invention, super-resources which are allocated to the base station BS(1) for an uplink transmission are not usable (at least) for downlink transmissions by other adjacent base stations, such as the base station BS(2).

According to an embodiment of the present invention, if the received power of the PRACH used by the UE UE(3) is lower than the power of the downlink reference signals received from the base stations of the adjacent cells, the UE UE(3) is assessed to be in a "critical condition" (from the interference point of view) and the base station BS(1) is configured to evaluate the amount of time/frequency resources needed to serve the UE UE(3), and sends a request of super-resources allocation to a network manager or to the adjacent base station(s) BS(2). The super-resources size depends on the number of UEs in critical condition over the entire network or over a portion thereof.

In principle, according to an embodiment of the present invention, each base station is configured to evaluate the amount of super-resources required to correctly prevent the occurrence of interference based on the number of UEs which are assessed to be in the critical condition. This information is then used to carry out a super-resources configuration (block 250). In the present description, by "super-resources configuration" it is intended the selection of which resources are elected as super-resources and the size thereof.

Figure 4A:
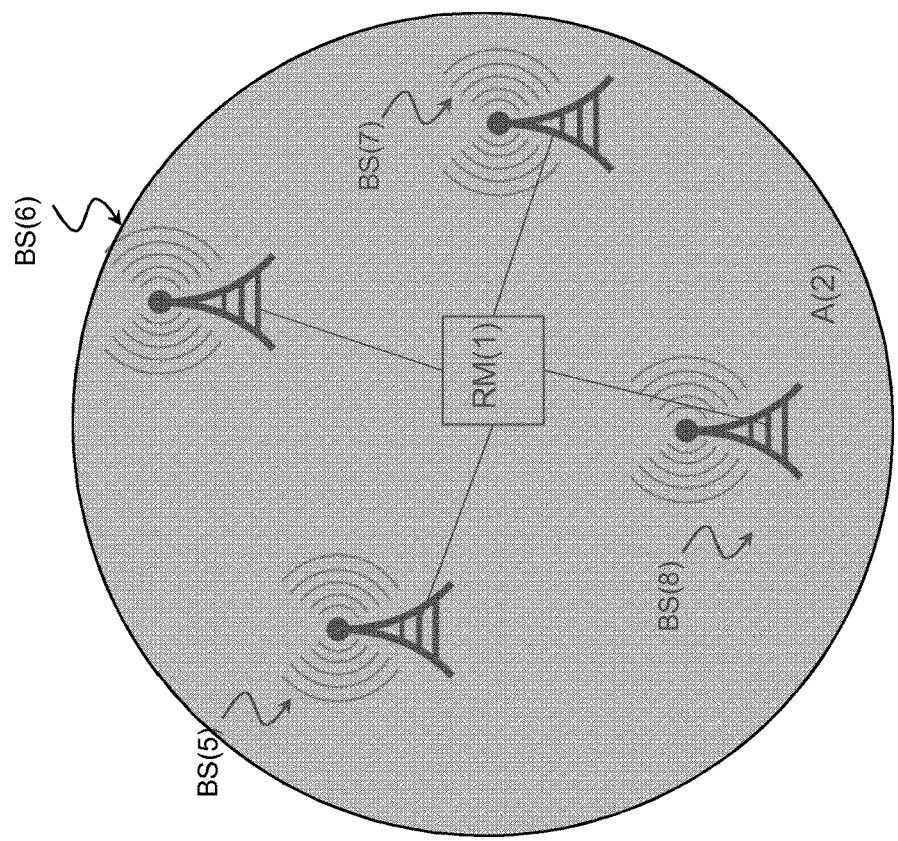
FIG. 4A illustrates an example in which the configuration of super-resources is carried out by a central entity.

According to an embodiment of the present invention, the super-resources configuration is carried out by a central entity, such as a network resource manager. This is illustrated in the example of FIG. 4A, wherein the super-resources are configured by a network resource manager RM(1) which is connected to four base stations BS(5), BS(6), BS(7) and BS(8) for the management thereof. The area corresponding to the cells covered by such four base stations BS(5), BS(6), BS(7) and BS(8) defines a corresponding coordination area A(2).

Figure 4B:
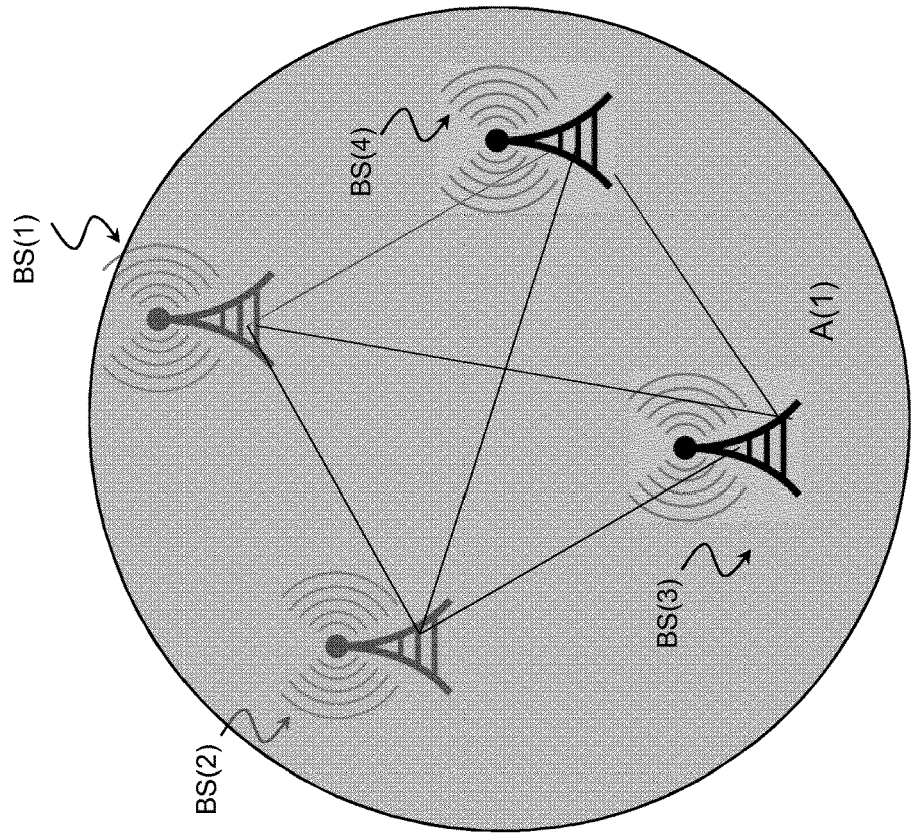
FIG. 4B illustrates an example in which the configuration of super-resources is carried out in a distributed way.

According to another embodiment of the present invention, the configuration of the super-resources is carried out in a distributed way, with a distributed decision involving a group of adjacent base stations. This is illustrated in the example of FIG. 4B, wherein the super-resources are configured by four adjacent base stations BS(1), BS(2), BS(3) and BS(4). The area corresponding to the cells covered by such four base stations BS(1), BS(2), BS(3) and BS(4) defines a corresponding further coordination area A(1).

According to an embodiment of the invention, the super-resources configuration is shared among the (adjacent) base stations belonging to a coordination area A(1) or A(2), such as for example by exploiting the LTE X2 logical interface. In this way, base stations belonging to a same coordination area are base stations which share in a coordinated way the same super-resources In other words, according to an embodiment of the present invention, a super-resource of a coordination area is an amount of time/frequency/space transmission resource reserved only to uplink transmission. According to an embodiment of the present invention, when a super-resource is allocated for the uplink transmission of a UE belonging to a coordination area, such super-resource is not usable for downlink transmission by the other base station(s) belonging to the same coordination area.

FIGS. 3A, 3B, and 3C illustrate three possible types of super-resources configurations according to some embodiments of the present invention.

In the embodiment of the invention illustrated in FIG. 3A, the super-resources configuration provides for having one or more subframes (in the example illustrated, the subframe s(5)) that is/are reserved only for uplink transmission, while the other subframes (in the example illustrated, the subframes s(1)-s(4) and s(6)-s(9)) may be allocated both for downlink and uplink transmissions.

In the embodiment of the invention illustrated in FIG. 3B, the super-resources configuration provides for having one or more portions (in the example illustrated, the portion b(5)) of the system bandwidth which is/are reserved only for uplink transmission, while the other portions (in the example illustrated, the portions b(1)-b(4) and b(6)-b(9)) may be allocated both for downlink and uplink transmissions.

In the embodiment of the invention illustrated in FIG. 3C, the super-resources configuration provides for a vertical sectorization deployment scenario where a cell comprises two sectors defined by two radio beams with different downtilt angle. Making reference to cell C(1) of the base station BS(1), the sector S(1)(1) defined by the beam with the higher downtilt angle (e.g. 10°, 12°, etc.) corresponds to the area of the cell C(1) which is close to the location of the base station BS(1), while the sector S(1)(2) defined by the beam with the lower downtilt angle (e.g. 4°, 6°, etc.) corresponds to the area of the cell C(1) far away from the location of the base station BS(1). In this deployment scenario the sector S(1)(2) in FIG. 3C corresponding to the edge of the cell C(1) can be reserved for uplink and downlink transmission in different bands (this means that can be configured for super-resources transmission), while the sector S(1)(1) in FIG. 3C can be used for full duplex transmission of downlink and uplink in the same band. In the case at issue, the sector S(1)(2) that is located close to the edge of cell C(1) can be used for uplink and downlink transmissions in different bands, thus avoiding the downlink interference coming from adjacent cells, while the sector S(1)(1) located close to the base station BS(1) location is used for full duplex transmission in the same band.

According to an embodiment of the present invention, the super-resources configuration may also provide for the concurrent provisions of two or also all of the examples illustrated in FIGS. 3A, 3B, 3C.

According to an embodiment of the present invention, once the super-resources configuration is set and shared among the base stations of a coordination area, the super-resources pertaining to said coordination area are actually allocated to the UEs of such area which are in critical condition according to the super-resources configuration itself (block 255).

Once the resource allocation is carried out—either with the "standard" resources allocated at blocks 240 and 245 or with the super-resources allocated at block 255—the base station BS(1) assigns said allocated resources to the served UE for uplink transmission from the latter toward the base station BS(1) itself.

A FD network needs the definition of orthogonal resources, to preserve the uplink transmissions from the interference caused by downlink transmissions coming from adjacent cells and when the interference suppression techniques are not sufficient. This problem can be even more severe in case of heterogeneous networks where base station BS(1) which is serving the UE whose uplink transmission is affected by interference is a base station of a small cell, and the base station BS(2) whose downlink transmission is causing interference to the uplink transmission is a base station of a macro cell. This mechanism can be seen as a form of ICIC (Inter Cell Interference Coordination) applied to the cell-to-cell interference in a Full Duplex network.

According to an embodiment of the present invention, the size of the super-resources can be semi-statically defined among a certain number of coordinated cells taking into account the number of UEs in critical condition (i.e., UEs assessed to be located inside the uplink extended edge area and having an uplink transmission power which is lower than the power of the interfering downlink transmissions coming from adjacent cells).

According to an embodiment of the present invention, the super-resources allocation can be semi-static and changed with a low periodicity.

According to an embodiment of the present invention, in order to increase the periodicity of the super-resources allocation, a specific signalling among neighbouring cells can be defined to request/refuse/update and release the allocation of the super-resources. This dynamic super-resources allocation is an on demand request which can allow a fast allocation of the super-resources assuming that the cell-to-cell communication is possible with sufficient low latency or exploiting the connection with a centralized Radio Resource Controller (not illustrated in the figures).

According to an embodiment of the present invention, the case in which the base station BS(1) allocates radio resources for the uplink transmission of the UE UE(3') while suppressing at the same time the interference caused by the downlink transmissions generated by the adjacent base stations over the allocated uplink resources (branch 225 and block 245 of the activity flow chart 200 of FIG. 2) may be also contemplated when the UE UE(3') has been assessed to be located inside the uplink extended edge area EEA1 of the base station BS(1) and at the same time the uplink transmission corresponding to such UE UE(3') has a lower priority compared to the one of other uplink transmissions managed by the same base station BS(1). Examples of high priority uplink transmissions may comprise uplink control channel or feedback reporting signals.

According to an embodiment of the present invention, the case in which the base station BS(1) allocates super-resources for the uplink transmission of the UE UE(3) (branch 230 and blocks 250-255 of the activity flow chart 200 of FIG. 2) may be also contemplated when the UE UE(3) has been assessed to be located inside the uplink extended edge area EEA1 of the base station BS(1) and at the same time the uplink transmission corresponding to such UE UE(3) has a high priority (such as for example in case the UE UE(3) is transmitting an uplink control channel signal or a feedback reporting signal).

According to an embodiment of the present invention, if the base station BS(1) is already aware that a served UE, such as the UE UE(3), is located inside the uplink extended edge area EEA1, the phase of measuring the power of uplink transmissions received by the base station BS(1) from served UEs (block 210 of the activity flow chart 200 of FIG. 2) may be further improved by having the UE transmitting over a super-resource a dedicated sounding signal to the serving base station, from which it is possible to obtain more detailed information about the quality of the uplink transmission of such UE. Since said dedicated sounding signal is transmitted over a super-resource, such sounding signal is not affected by interference caused by downlink transmissions coming from adjacent cells, and therefore the information about the quality of the uplink transmission of the UE is quite robust.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A method for managing a full duplex mobile telecommunication network, comprising:
having a base station measure a power of downlink transmissions received by said base station from adjacent base stations;
having said base station measure a power of uplink transmissions received by said base station from at least one served user equipment;

having said base station compare the measured power of downlink transmissions with the measured power of uplink transmissions;

if the measured power of an uplink transmission from a served user equipment is lower than the measured power of downlink transmissions by a corresponding amount, carrying out the following operation:

having said base station allocate for the uplink transmission from said served user equipment, corresponding first dedicated uplink radio resources from radio resources which are reserved only for uplink transmission, said first dedicated uplink radio resources, when allocated to said base station, not being usable for downlink transmissions by further base stations adjacent to said base station, and having said base station assign said allocated first dedicated uplink radio resources to said served user equipment for uplink transmission from the served user equipment toward said base station, wherein said mobile telecommunication network includes at least one coordination area comprising a group of adjacent base stations including said base station, and the method further comprises configuring, for said at least one coordination area, radio resources by reserving uplink radio resources to the base stations belonging to said coordination area, said uplink radio resources being radio resources shared by the base stations belonging to the coordination area to be used only for uplink transmission, and selecting one or more portions of a bandwidth of the mobile telecommunication network to be reserved only for uplink transmission.

2. The method of claim 1, wherein further comprising:
said first dedicated uplink radio resources is selected from the uplink radio resources reserved to the coordination area the base station belongs to.

3. The method of claim 2, wherein said configuring the radio resources for said at least one coordination area comprises selecting one or more subframes to be reserved only for uplink transmission.

4. The method of claim 2, wherein each base station covers a corresponding cell according to a vertical sectorization deployment for which a high tilt beam defines a cell sector close to the edge of the cell and a low tilt beam defines a further cell sector close to the base station, said configuring the radio resources for said at least one coordination area comprising selecting radio resources of the cell sector close to the edge of the cell.

5. The method according to claim 2, wherein said configuring the radio resources for said at least one coordination area is carried out by a selected one between:
a central entity of the coordination area, and
the base stations belonging the coordination area.

6. The method of claim 1, wherein said measuring the power of downlink transmissions comprises measuring the power levels of downlink reference signals transmitted by the adjacent base stations.

7. The method of claim 1, wherein said measuring the power of uplink transmissions comprises monitoring a physical random access channel used by the at least one served user equipment.

8. The method of claim 1, wherein said corresponding amount is equal to at least 2 dB.

9. A full duplex mobile telecommunication network comprising a plurality of base stations, each base station of the plurality comprising:

a processor configured to measure a power of downlink transmissions received by said base station from adjacent base stations;

measure a power of uplink transmissions received by said base station from at least one served user equipment;

compare the measured power of downlink transmissions with the measured power of uplink transmissions;

allocate for the uplink transmission from said served user equipment, if the measured power of an uplink transmission from a served user equipment is lower than the measured power of downlink transmissions by a corresponding amount, corresponding first dedicated uplink radio resources, said first dedicated uplink radio resources being radio resources which are reserved only for uplink transmission, said first dedicated uplink radio resources, when allocated to said base station, being not usable for downlink transmissions by further base stations adjacent to said base station, wherein said mobile telecommunication network includes at least one coordination area comprising a group of adjacent base stations including said base station, and said processor is further configured to assign said allocated first dedicated uplink radio resources to said served user equipment for uplink transmission from the served user equipment toward said base station, and configure, for said at least one coordination area, radio resources by reserving uplink radio resources to the base stations belonging to said coordination area, said uplink radio resources being radio resources shared by the base stations belonging to the coordination area to be used only for uplink transmission, and select one or more portions of a bandwidth of the mobile telecommunication network to be reserved only for uplink transmission.

* * * * *